(12) United States Patent
Grolleman et al.

(10) Patent No.: US 10,131,103 B2
(45) Date of Patent: Nov. 20, 2018

(54) METHOD FOR PICKING UP AND PLACING TIRE COMPONENTS ON A TRANSFER DRUM

(71) Applicant: VMI HOLLAND B.V., Epe (NL)

(72) Inventors: Henk-Jan Grolleman, Eerbeek (NL); Luuk van Tienen, Epe (NL)

(73) Assignee: VMI HOLLAND B.V., Epe (NL)

( * ) Notice: Subject to any disclaimer, the term of this patent is extended or adjusted under 35 U.S.C. 154(b) by 99 days.

(21) Appl. No.: 15/022,675

(22) PCT Filed: Jul. 3, 2014

(86) PCT No.: PCT/NL2014/050443
§ 371 (c)(1),
(2) Date: Mar. 17, 2016

(87) PCT Pub. No.: WO2015/050437
PCT Pub. Date: Apr. 9, 2015

(65) Prior Publication Data
US 2016/0229139 A1   Aug. 11, 2016

(30) Foreign Application Priority Data
Oct. 2, 2013   (NL) .................................... 2011541

(51) Int. Cl.
*B29D 30/26* (2006.01)
*B29D 30/46* (2006.01)
(Continued)

(52) U.S. Cl.
CPC ....... *B29D 30/0016* (2013.01); *B29D 30/005* (2013.01); *B29D 30/0061* (2013.01);
(Continued)

(58) Field of Classification Search
CPC .......................... B29D 30/0016; B29D 30/26; B29D 30/3007; B29D 2030/0038;
(Continued)

(56) References Cited

U.S. PATENT DOCUMENTS 3,654,828 A   4/1972   Leblond et al.
4,276,104 A   6/1981   Riggs
(Continued)

FOREIGN PATENT DOCUMENTS

CN   1038980 A   1/1990
CN   1455730 A   11/2003
(Continued)

OTHER PUBLICATIONS

SIPO Search Report issued in Chinese Patent Application No. 201480053785.7 dated Feb. 23, 2017, 2 pages.
International Search Report issued in PCT/NL2014/050443 dated Oct. 14, 2014.
Written Opinion of International Search Authority issued in PCT/NL2014/050443 dated Oct. 14, 2014.
(Continued)

*Primary Examiner* — Martin K Rogers
(74) *Attorney, Agent, or Firm* — RatnerPrestia

(57) ABSTRACT

The invention relates to a method for picking up and placing a tire components, wherein the method includes the steps of picking up a supplied first tire component with a transfer drum, rotating the transfer drum in a first direction for winding a predetermined length of the continuous length of the first tire component, rotating the transfer drum in the opposite second direction, while at the same time moving the transfer drum downstream into a cutting position, wherein a part of the predetermined length of the first tire component is unwound from the transfer drum, cutting the unwound part, thereby obtaining a cut-to-length first tire component, and rotating the transfer drum again in the first direction for winding up the unwound part of the cut-to-length first tire component up to the trailing end.

23 Claims, 5 Drawing Sheets

(51) Int. Cl.
*B29D 30/00* (2006.01)
*B29D 30/44* (2006.01)
*B29D 30/30* (2006.01)
*B29D 30/32* (2006.01)
*B29D 30/24* (2006.01)

(52) U.S. Cl.
CPC ......... *B29D 30/30* (2013.01); *B29D 30/3007* (2013.01); *B29D 30/32* (2013.01); *B29D 30/44* (2013.01); *B29D 30/46* (2013.01); *B29D 2030/0044* (2013.01); *B29D 2030/0066* (2013.01); *B29D 2030/241* (2013.01); *B29D 2030/3078* (2013.01)

(58) Field of Classification Search
CPC ...... B29D 2030/241; B29D 2030/2671; B29D 2030/2628; B29D 2030/2685; B29D 2030/2692; B29D 2030/4468; B29D 2030/4475; B29D 2030/4481; B29D 2030/4487; B29D 2030/4493; B29D 30/46; B29D 2030/2678
See application file for complete search history.

(56) References Cited

U.S. PATENT DOCUMENTS

| | | | |
|---|---|---|---|
| 5,248,374 A * | 9/1993 | Shimizu | B29D 30/3007 156/133 |
| 6,695,949 B1 | 2/2004 | Jungk et al. | |
| 2003/0051794 A1 | 3/2003 | Suda et al. | |
| 2008/0185095 A1 | 8/2008 | Gutknecht | |

FOREIGN PATENT DOCUMENTS

| | | |
|---|---|---|
| CN | 101107119 A | 1/2008 |
| DE | 27 40 609 | 3/1979 |
| EP | 0 561 609 A1 | 9/1993 |
| EP | 1 985 561 A1 | 10/2008 |
| SU | 1243957 A1 | 7/1986 |
| SU | 1565721 A1 | 5/1990 |

OTHER PUBLICATIONS

Search Report issued in Russian Patent Application 2016116795 dated Feb. 20, 2018, with partial English translation, 3 pages.

* cited by examiner

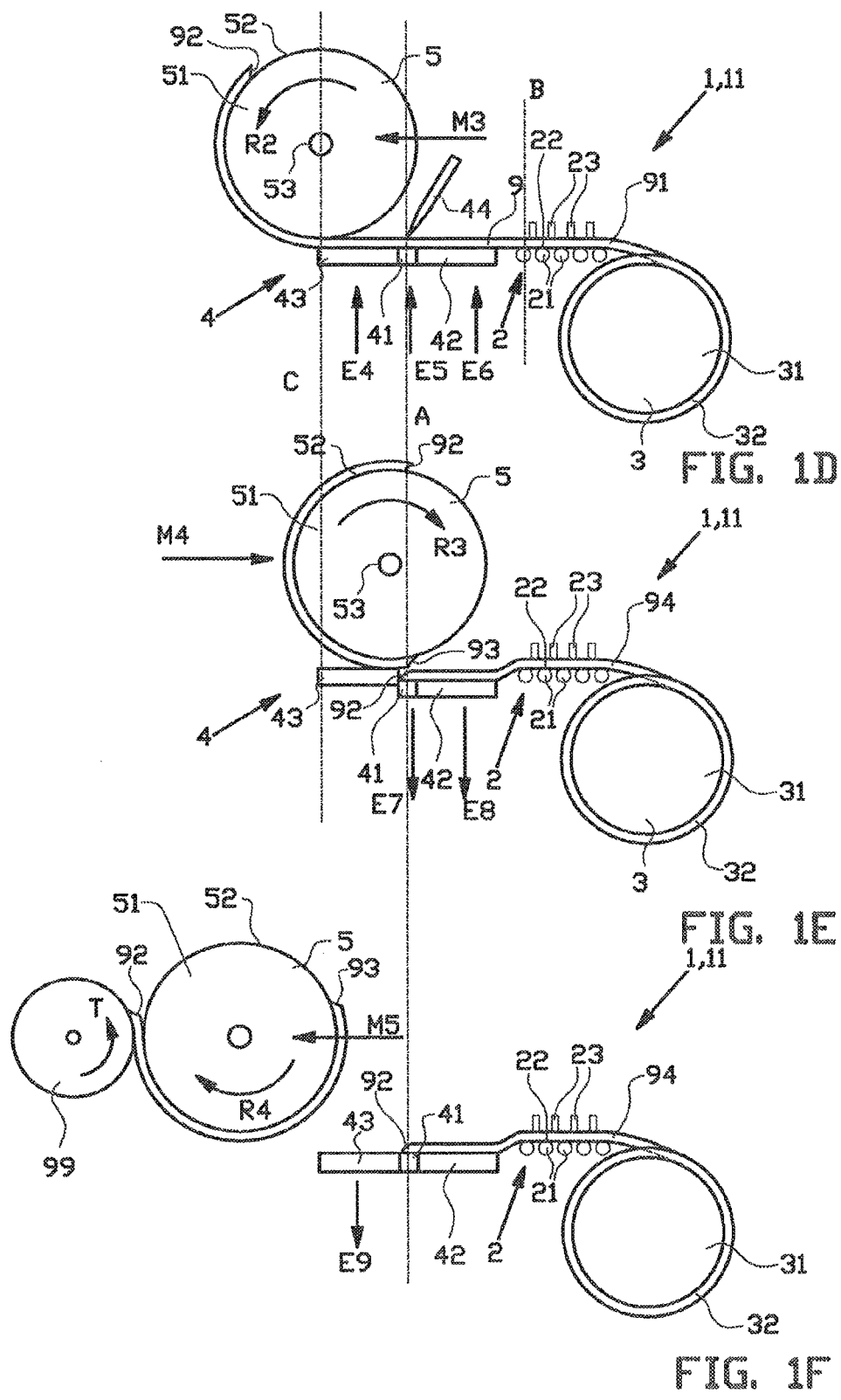

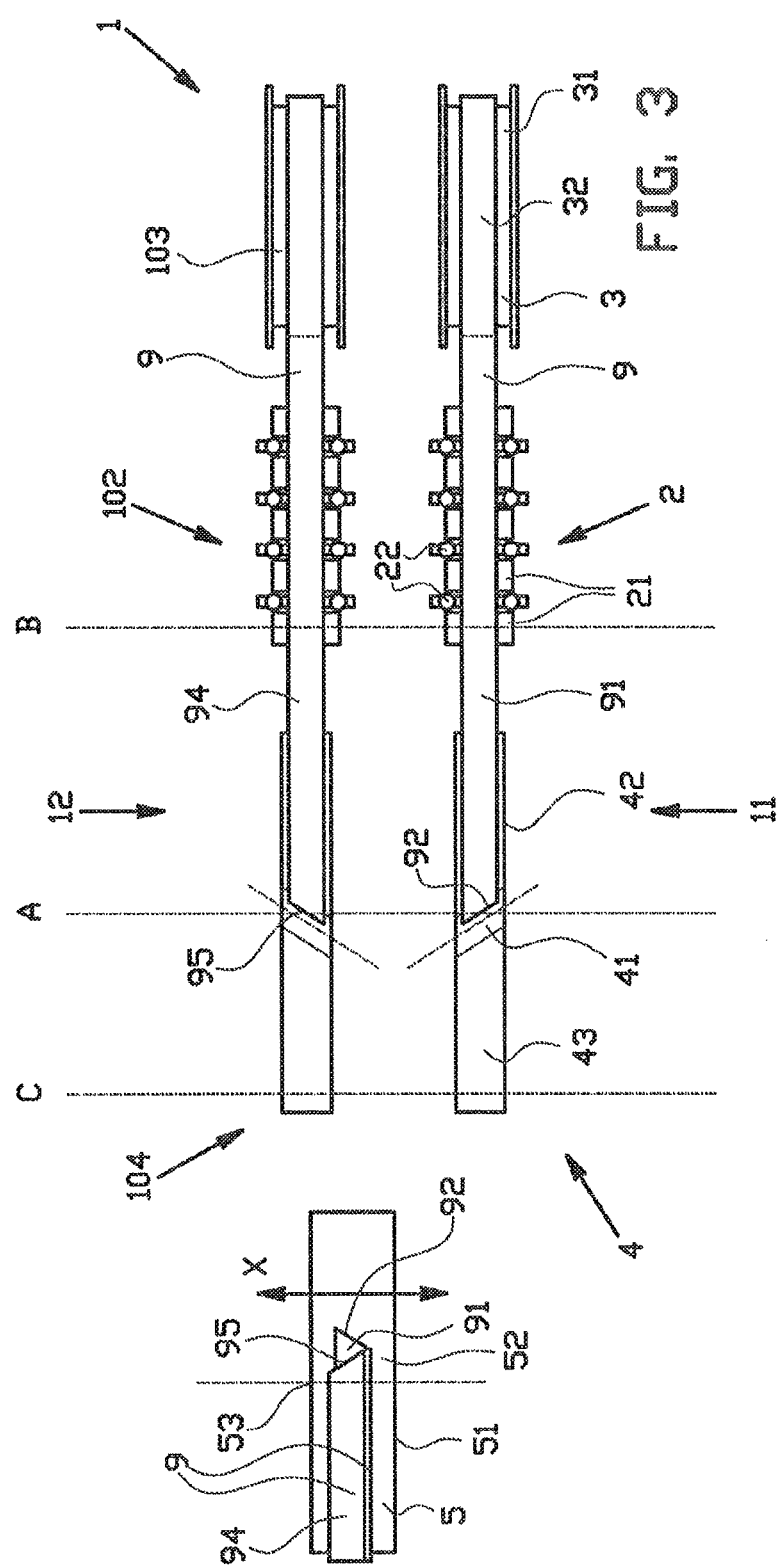

METHOD FOR PICKING UP AND PLACING TIRE COMPONENTS ON A TRANSFER DRUM

CROSS REFERENCE TO RELATED APPLICATIONS

This application is the U.S. National Phase Application of PCT/NL2014/050443, filed Jul. 3, 2014, which claims priority to Netherlands Patent Application No. 2011541, filed Oct. 2, 2013, the contents of such applications being incorporated by reference herein.

FIELD OF THE INVENTION

The invention relates to a method for picking up and placing tire components.

BACKGROUND OF THE INVENTION

Conventionally, a tire component is supplied to a first conveyor, cut at a cutting system between the first roller conveyor and a second roller conveyor, and subsequently conveyed by the second roller conveyor towards a transfer drum or towards a building drum. At each transition of the tire components from one roller conveyor to the next roller conveyor, or from a roller conveyor to a drum, the tire component is momentarily unsupported, and its actual position may shift with respect to the intended or theoretical position. In particular, at the transition from a roller conveyor to a drum, the roller conveyor can not physically extend up to the circumferential surface of the drum, and the tire component is dropped over the remaining distance from the last roll of the roller conveyor onto the circumferential surface of the drum. Thus, a direct and reliable transfer of the tire component is not possible.

SUMMARY OF THE INVENTION

An aspect of the present invention provides a method for picking up and placing tire components, wherein shifting in the position of tire components during picking up and placing thereof can be prevented.

The invention provides a method for picking up and placing a first tire component in a first tire component manufacturing line of a tire building assembly, wherein the first tire component manufacturing line comprises a supply system at an upstream end thereof, a cutting system at a downstream end thereof and a transfer drum with a circumferential surface and retaining elements for picking up and retaining the first tire component around the circumferential surface, wherein the method comprises the steps of:
  a) supplying a continuous length of the first tire component from the supply system in the downstream direction towards the cutting system, wherein the first tire component has a leading end facing in the downstream direction;
  b) positioning the transfer drum in a first pick up position at the leading end of the continuous length of the first tire component and picking up said leading end with the retaining elements;
  c) subsequently rotating the transfer drum in a first circumferential direction for winding a predetermined length of the continuous length of the first tire component around the circumferential surface of the transfer drum and retaining said predetermined length with the retaining elements;
  d) rotating the transfer drum in an opposite second circumferential direction, while at the same time moving the transfer drum downstream into a cutting position at the cutting system, wherein a part of the predetermined length of the first tire component is released from the retaining elements and is unwound from the circumferential surface onto the cutting system;
  e) cutting the unwound part of predetermined length of the first tire component at the cutting system to create a trailing end, thereby obtaining a cut-to-length first tire component;
  f) rotating the transfer drum again in the first circumferential direction for winding up the unwound part of the cut-to-length first tire component up to the trailing end.

The transfer drum can thus be used to pick up and place the leading end of the continuous length of the first tire component and a predetermined length upstream of the leading end. The predetermined length, while still connected to the continuous length of the first tire component from the supply system, can subsequently be unwound and reliably placed by the transfer drum onto the cutting system for creating the cut-to-length first tire component. Thereafter, the cut-to-length first tire component, which is still partly retained by the transfer drum, can be reliably rewound onto the transfer drum for transfer to a building drum. After the initial pick up of the leading end, the first tire component can be reliably retained by the transfer drum at all times throughout the rest of the method. Thus, the risk of shifting during the picking up and placing can be reduced.

In an embodiment the circumferential surface of the transfer drum, in step b), is brought into direct contact with the leading end prior to said leading end being picked up. By bringing the transfer drum into direct contact with the leading end prior to the pick up, shifting in the leading end during the pick up can be prevented.

In an embodiment the part of the predetermined length of the first tire component in step d) is gradually released from the retaining elements after said part has been brought into direct contact with the cutting system. In this manner, the part can be gradually released as it is progressively brought into contact with the cutting system, thereby preventing an uncontrolled drop of the part from transfer drum onto the cutting system.

In an embodiment the transfer drum, during step c), simultaneously moves from the first pick up position to a second pick up position upstream of the first pick up position for at least partly picking up the predetermined length. In this manner, the transfer drum can at least partly pick up the predetermined length with the predetermined length remaining stationary.

In an embodiment the transfer drum, during the upstream movement in step c), moves upstream at a velocity that is substantially equal to the circumferential velocity of the circumferential surface of the transfer drum. As a result of the combined movement and rotation of the transfer drum, the relative velocity of the circumferential surface at contact with the continuous length of the first tire component can be reduced to null. The continuous length of the first tire component can thus be picked up by and transferred to the transfer drum in a controlled manner without substantial shifting, stretching or compression.

In an embodiment the transfer drum, after it has arrived in the second pick up position, is rotated further in the first circumferential direction while remaining in the second pick up position for picking up the remainder of the predetermined length. Thus, the tire building assembly can be kept relatively compact, as the transfer drum does not need to be moved upstream over a distance equivalent to a full circumference.

In an embodiment the tire building assembly is provided with a conveyor, preferably a roller conveyor, wherein the conveyor is arranged at the second pick up position to support and/or guide the supply of the remaining part of the predetermined length from the supply system to the transfer drum. The conveyor can ensure a proper positioning or alignment of the supplied continuous length of the first tire component with respect to the transfer drum. Moreover, the rollers of the conveyor can support and convey the continuous length of the first tire component while the transfer drum is picking up said predetermined length in the second pick up position.

In an embodiment the transfer drum, during step d), moves downstream at a velocity that is substantially equal to the circumferential velocity of the circumferential surface of the transfer drum. Again, the relative velocity of the circumferential surface with respect to the first tire component at contact can be reduced to null, thereby preventing shifting, stretching or compression.

In an embodiment the transfer drum, during step f) is simultaneously moved upstream from the cutting position.

In an embodiment the transfer drum, during the upstream movement in step f), moves upstream at a velocity that is substantially equal to the circumferential velocity of the circumferential surface of the transfer drum. Again, the relative velocity of the circumferential surface with respect to the first tire component at contact can be reduced to null, thereby preventing shifting, stretching or compression.

In an embodiment the method further comprises repeating steps a) to f) for a second tire component. Thus, a second tire component can be manufactured in the same manner as the first tire component.

In an embodiment the tire building assembly further comprises a second tire component manufacturing line with the same features as the first tire component manufacturing line, wherein the transfer drum is moveable between the first tire component manufacturing line and the second tire component manufacturing line, wherein steps a) to f) are repeated for the second tire component at the second tire component manufacturing line. The second tire component manufacturing line allows for easy and quick switching between first and second tire components with different manufacturing characteristics, without the need for reconfiguring the manufacturing lines and consequent loss of valuable time and/or materials.

In an embodiment the cut-to-length first tire component is retained around the circumferential surface of the transfer drum during the repetition of steps a) to f) for the second tire component, wherein the second tire component is retained around the circumferential surface of the transfer drum in a radially outer position with respect to the cut-to-length first tire component. In this manner, the transfer drum can subsequently pick up two or more tire components and pre-assemble said tire components into a laminate around its circumferential surface. The laminate can be transferred at once from the transfer drum onto a building drum.

In a preferred embodiment the cut-to-length first tire component and the cut-to-length second tire component are components for a chafer. A chafer comprises two or more tire components with different characteristics, which can be pre-assembled on the transfer drum prior to transferring the chafer as a whole to the building drum.

In a preferred embodiment the first tire component is cut under an angle and the second tire component is cut under another angle opposite to the angle of the cut in the first tire component. When pre-assembled on the transfer drum, the first tire component and the second tire component can form a laminate with crossed leading ends and trailing ends. In such tire components, the steel or textile reinforcements typically run parallel to the cutting angle, and thus, a laminate with crossed reinforcements can be obtained.

In an embodiment the cut-to-length first tire component is shifted in a circumferential direction of the transfer drum with respect to the cut-to-length second tire component. In this manner, the pre-assembled laminate on the transfer drum can be prepared for optimal transfer to a building drum, for example when one of the tire components has to be brought into contact with the building drum prior to the other of the tire components. Also, when the tire components are cut under different angles, as indicated above, then the shifting allows for the leading ends and trailing ends to be shifted, so that the edges thereof do not interfere or overlap.

In an embodiment the tire building assembly further comprises a building drum with a circumferential surface, wherein the method further comprises the steps of:

g) moving the transfer drum with the cut-to-length first tire component retained thereon into proximity of the building drum;

h) subsequently rotating the transfer drum and the building drum in mutually opposite circumferential directions for transferring the cut-to-length first tire component from the circumferential surface of the transfer drum onto the circumferential surface of the building drum.

By transferring the cut-to-length first tire component from the transfer drum to the building drum, the cut-to-length first tire component can be controlled by the transfer drum throughout the method up to the transfer to the building drum. During the method, shifting of the first tire component can be prevented, so that, at transfer to the building drum, the cut-to-length first tire component can be accurately positioned on the building drum.

In an embodiment the leading end or the trailing end of the cut-to-length first tire component, in step g), is brought into contact with the circumferential surface of the building drum. Typically, the leading end is transferred first to the building drum, so that the trailing end can be spliced on top of the leading end. If the building drum is however already provided with a tire component assembly that is not entirely flat, and the trailing end is more likely to come into contact with the uneven tire component assembly earlier than the leading end will, than a reversed transfer can be performed in which the trailing end is transferred first.

In an alternative embodiment, when also a second tire component has been picked up by the transfer drum, the leading end or the trailing end of the cut-to-length second tire component, in step g), is brought into contact with the circumferential surface of the building drum. The second tire component is in the radially outer position with respect to the first tire component on the transfer drum and can be transferred to a radially inner position with respect to the first tire component onto the building drum. Again, one can choose between a transfer with the leading end first or a reversed transfer with the trailing end first.

In an embodiment the tire building assembly comprises an alignment sensor that is arranged at the transfer of the first tire component between the transfer drum and the building drum, wherein the alignment sensor, during step h), detects misalignment of the first tire component and controls the position of the transfer drum relative to the building drum to correct the misalignment. This may provide a final correction of misalignment or shifting not prevented by the aforementioned method.

In an embodiment the cutting system comprises an intermediate cutting support and a downstream cutting support directly downstream of the intermediate cutting support, wherein the first tire component is cut in step e) at the intermediate cutting support, wherein the trailing end of the cut-to-length first tire component is retained by the intermediate cutting support and/or the downstream cutting support until the trailing end is picked up by the transfer drum in step f). Preferably the cutting system further comprises an upstream cutting support directly upstream of the intermediate cutting support, wherein the cutting in step e) creates a new leading end for the remaining continuous length of the first tire component upstream of the cutting system, wherein the leading end of the remaining continuous length of the first tire component is retained on the upstream cutting support until it is picked up by the transfer drum in step b) during a next cycle of the method. Thus, at any time during the method, the tire components can be reliably retained in position by either the transfer drum and/or the cutting supports.

In an embodiment the first pick up position is located at or near the intermediate cutting support. Since the cut is made at the intermediate cutting support, the transfer drum can pick up the leading end at the location where the cut is made, thereby reducing the risk of shifting of the leading end.

In an embodiment the cutting supports are provided with magnetic elements or comprise suction openings of a vacuum system for retaining tire components. The magnetic elements can magnetically attract metal reinforcements in the tire components, while the suction openings can retain rubber material of the tire components by suction.

In an embodiment the retaining elements comprise magnets and suction openings of a vacuum system, wherein the magnets and the vacuum system are operated simultaneously for retaining the first tire component. The combined magnetic attraction and suction can be sufficient to retain the first tire components. When both are operation at the same time, the amount of energy required to operate the magnets and the vacuum system individually can be reduced.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of exemplary embodiments as shown in the attached schematic drawings, in which:

FIGS. 1A-1F show a tire building assembly during six subsequent steps of a method for picking up and placing of tire components according to an exemplary embodiment of the invention;

FIG. 3 show a top view of the tire building assembly according to FIGS. 1A-1F and FIGS. 2A-2F.

DETAILED DESCRIPTION OF THE INVENTION

Figure 1A:
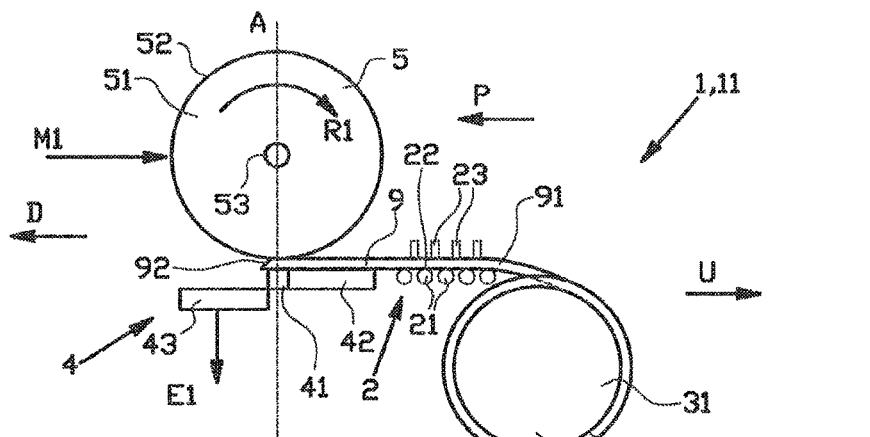

FIGS. 1A-F, FIGS. 2A-F and FIG. 3 show a tire building assembly 1 for picking up and placing tire components 9, according to an exemplary embodiment of the invention.

As shown in FIG. 3, the tire building assembly 1 comprises a first tire component manufacturing line 11 for manufacturing a first tire component 91 and an optional second tire component manufacturing line 12 for manufacturing a second tire component 94. The tire component manufacturing lines 11, 12 are arranged parallel to each other so that picking up and placing of the tire components 9 may take place for each tire component manufacturing line 11, 12 in the same parallel direction. The lines 11, 12 are elongate and have an upstream direction U and a downstream direction D. In FIGS. 1A-F, the steps of a method are shown for picking up, placing and manufacturing the first tire component 91 at the first tire component line 11. In FIGS. 2A-F, optional additional steps of the method are shown for picking up, placing and manufacturing the second tire component 94 at the second tire component line 12.

As shown in FIGS. 1A-F, the first tire component manufacturing line 11 comprises a conveyor 2 for conveying the first tire component 91, a supply system 3 for supplying first tire component 91 to the conveyor 2, a cutting system 4 for cutting the first tire component 91 and a transfer drum 5 for picking up and placing the first tire component 91 at various positions along the first tire component manufacturing line 11. The supply system 3 is located at the upstream end or in the upstream direction U of the first tire component manufacturing line 11, the cutting system 4 is located at the downstream end or in the downstream direction D of the first tire component manufacturing line 11 and the conveyor 2 is located between the supply system 3 and the cutting system 4.

As shown in FIGS. 1A-F, FIGS. 2A-F and FIG. 3, the first tire component manufacturing line 11 and the second tire component manufacturing line 12 are substantially the same or identical, apart from being mirrored with respect to a longitudinal mirror plane (not shown) in between the lines 11, 12. The person skilled in the art will thus appreciate that the description below with respect to the first tire component manufacturing line and the first tire component 91 also applies to the second tire manufacturing line 12 and the second tire component 94. Accordingly, the second tire component manufacturing line 12 comprises a conveyor 102, a supply system 103 and a cutting system 104 with identical features as the corresponding features in the first tire component manufacturing line 11.

The features for both tire component manufacturing lines 11, 12 will be described hereafter in more detail with reference to the first tire component manufacturing line 11 only.

The conveyor 2 is a roller-type conveyor comprising a plurality of support rollers 21. The support rollers 21 extend in a mutually parallel manner in substantially the same plane, preferably a substantially horizontal plane, to form a conveyor surface 22 for supporting the tire components 9 in a direction of conveyance P. Alongside the conveyor surface 22, parallel to the first direction of conveyance P, the conveyor 2 comprises two series of guide rollers 23. The guide rollers 23 form boundaries or guides for the guiding and limiting the freedom of movement of the tire components 9 on both sides of the conveyor surface 22 during conveyance.

In this exemplary embodiment, the supply system 3 comprises a reel 31 onto which a supply 32 of a substantially continuous length of the first tire component 91 has been wound. The continuous length of the first tire component 91 can be unwound or supplied from the supply system 3 by rotating the reel 31 in a rotational supply direction S, as shown in FIG. 1C. The continuous length of the first tire component 91 may alternative be supplied from any suitable supply means, such as a supply conveyor, a festooner and/or directly from an extruder. The continuous length of the tire component 91 is supplied into the downstream direction D, along the direction of conveyance P, towards the cutting system 4.

The cutting system 4 comprises an intermediate cutting support 41, an upstream cutting support 42 positioned directly upstream of the intermediate cutting support 41 and a downstream cutting support 43 positioned directly downstream of the intermediate cutting support 41. In this exemplary embodiment, the cutting supports 41-43 comprise magnetic elements or are magnetic, so that tire components 9 with metal reinforcements can be retained on the cutting supports 41-43. Alternatively, the cutting supports 41-43 may comprise suction openings of a vacuum system for retaining the tire components 9 by suction. The cutting supports 41-43 are individually moveable between an upper position in which the cutting supports 41-43 are flush with the conveyor surface 22 and a lower position in which the cutting supports 41-43 are recessed or retracted below the conveyor surface 22.

As shown in FIG. 1D and FIG. 3, the cutting system 4 further comprises a cutter or knife 44 which is arranged for cutting the continuous length of the first tire component 91 at the intermediate cutting support 41 into predetermined lengths of the first tire component 91. As shown in FIG. 1E, the cut-to-length first tire component 91 has a leading end 92 facing in the downstream direction and a trailing end 93 facing in the upstream direction with respect to the first direction of conveyance P. The knife 44 is arranged under a first cutting angle with the conveyor surface 22 (see FIG. 1D) and under a second cutting angle with respect to the first direction of conveyance P (see FIG. 3) so that, in another step of the tire building process which is not part of this invention, the leading end 92 and the trailing end 93 of the cut-to-length first tire component 91 may be spliced together to form a quality splice in a manner known per se. It is noted that for the mirrored cutting system 104 of the second tire component manufacturing line 12, the second cutting angle is opposite or mirrored to the second cutting angle of the cutting system 4 in the first tire component manufacturing line 11, in order to obtain tire components 9 with mutually opposite or crossed leading edges 92, 95 (see FIG. 3).

As shown in FIGS. 1A-F and FIG. 3, the transfer drum 5 comprises at least one radial sidewall 51, a circumferential surface 52 and an axis of rotation 53 rotated concentrically with respect to the circumferential surface 52. The transfer drum 5 is supported at its axis of rotation 53 by an axle of a moveable support structure (not shown). By moving the support structure, the transfer drum 5 can be moved to and positioned in various positions A, B, C along the first tire component manufacturing line 11 and the second tire component manufacturing line 12, and between both lines 11, 12 (see arrow X in FIG. 3). The tire building assembly 1 is provided with a drive for driving the transfer drum 5 in rotation in a first circumferential direction and in an opposite second circumferential direction about its axis of rotation 53. The transfer drum 5 is provided with retaining elements (not shown) for picking up and retaining tire components 9 around or against its circumferential surface 52. These retaining elements may for example be magnets for magnetically retaining tire components 9 with metal reinforcements or a suction openings of a vacuum system for retaining tire components 9 made of rubber by suction. Both retaining elements are known per se. Optionally, the transfer drum 5 is provided with both magnets and a vacuum system so that various types of tire components 9 can be picked up. This also allows for both the magnets and the vacuum system to be operational at the same time, so that both can operate at a lower level while the combined retaining force of the magnets and the vacuum system is sufficient to retain the tire components 9.

FIGS. 1A-F show six steps of a method for picking up and placing tire components 9 with the use of the aforementioned tire building assembly 1. In particular, the steps as shown in FIGS. 1A-F relate to the picking up and placing of the first tire component 91 at the first tire component manufacturing line 11 of the tire building assembly 1.

In FIG. 1A the situation is shown in which a continuous length of the first tire component 91 is supplied from the supply system 3 and is arranged on the conveyor 2. The continuous length of the first tire component 91 extends up to the intermediate cutting support and has been cut by the cutting system 4 during a previous cycle of the method. As a result, the continuous length of the first tire component 91 has a leading end 92. The intermediate cutting support 41 and the upstream cutting support 42 are in the upper or raised position flush with the conveyor surface 22 and the magnets or the vacuum system thereof retain the leading end 92. The downstream cutting support 43 has been dropped (E1) into the retracted position.

The transfer drum 5 has been moved (M1) by its support structure into a first pick up position A for picking up the leading end 92 of the continuous length of the first tire component 91 at the intermediate cutting support 41 of the cutting system 4. Preferably, the transfer drum 5 is already rotating (R1) in a first circumferential direction or winding direction with its circumferential surface 52 having substantially the same rotational speed or circumferential velocity as the speed or velocity at which the transfer drum 5 is moved during the movement M1 towards the first pick up position A. The circumferential surface 52 of the transfer drum 52 is brought into direct contact with the leading end 92 of the continuous length of the first tire component 91 and the retaining elements of the transfer drum 5 are activated to pick up and retain said leading end 92.

Figure 1B:
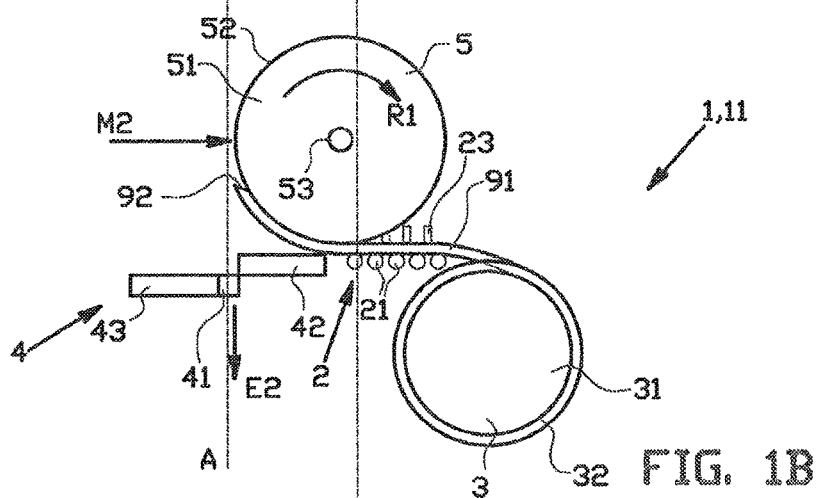
Figure 1C:
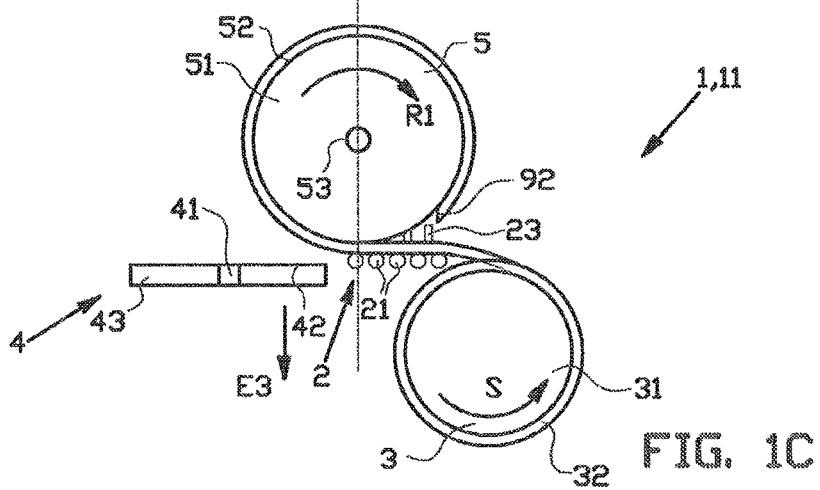

In FIG. 1B the situation is shown in which the transfer drum 5 has been moved further (M2) by its support structure towards a second pick up position B upstream of the first pick up position A. In this example, the second pick up position B is located at the conveyor 2. The leading end 92 of the continuous length of the first tire component 91 has been picked up from the intermediate cutting support 41. After the leading end 92 has been picked up from the intermediate cutting support 41, the magnets or the vacuum system in the intermediate cutting support 41 are deactivated and the intermediate cutting support 41 is dropped (E2) into a recessed position with respect to the conveyor surface 22 to release the previously held continuous length of the first tire component 91.

During the further movement M2 in FIG. 1B, the transfer drum 5 is simultaneously rotating (R1) in the winding direction with its circumferential surface 52 having substantially the same circumferential velocity as the velocity at which the transfer drum 5 is moved during from the first pick up position A towards the second pick up position B. As a result of the combined movement M2 and rotation R1 of the transfer drum 5, the relative velocity of the circumferential surface 52 of the transfer drum 5 at contact with the continuous length of the first tire component 91 is null. The continuous length of the first tire component 91 can thus be picked up by and transferred to the transfer drum 5 in a controlled manner without substantial shifting, stretching or compression. FIG. 1B shows the situation in which a part of the continuous length of the first tire component 91 after the leading end 92 thereof has been picked up and retained around the circumferential surface 52 of the transfer drum 5.

FIG. 1C shows the situation in which the transfer drum 5 has arrived in the second pick up position B at the conveyor 2. The magnets or the vacuum system in the upstream cutting support 42 are deactivated and the upstream cutting support 42 is dropped (E3) below the conveyor surface 22 to release the previously held continuous length of the first tire component 91. The transfer drum 5 is fixed in the second pick up position B against further movements upstream or downstream with respect to the conveyor 2. The transfer drum 5 however continues to rotate further (R1) in the winding direction to pick up and wind a further length of the first continuous tire component 91 around its circumferential surface 52. The further length of the first continuous tire component 91 is supplied from the supply 32 of the supply system 3, by rotating the reel 31 in a supply direction S. The rotation by the reel 31 in the supply direction S can either be controlled by a drive (not shown), which is actuated synchronously with the rotation R1 of the transfer drum 5, or it may be the result of the pulling of the transfer drum 5 on the continuous length of the first tire component 91 during the rotation R1 of the transfer drum 5. The support rollers 21 of the conveyor 2 facilitate the transport of the further length of the continuous length of the first tire component 91 from the supply system 3 towards the transfer drum 5, while the guide rollers 23 ensure the proper alignment of said further length.

The transfer drum 5 is rotated (R1) until a predetermined length of the continuous length of the first tire component 91 has been picked up and retained around its circumferential surface 52. In this example, said predetermined length is greater than the length between the leading end 92 and a predetermined position or cutting region at which the cut for the trailing end 93 is to be made.

In FIG. 1D the situation is shown in which the cutting supports 41-43 are raised (E4, E5, E6) into their upper positions, flush with the conveyor surface 22. The magnets or vacuum system in the cutting supports 41-43 are reactivated. The transfer drum 5 is moved downstream (M3) by its support structure from the second pick up position B towards and into a cutting position C at the downstream end of the cutting system 4, in particular at the downstream cutting support 43 directly downstream of the intermediate cutting support 41. Simultaneously with the downstream movement (M3), the transfer drum 5 is rotating (R2) in an opposite second circumferential direction or unwinding direction at substantially the same circumferential velocity as the velocity at which the transfer drum 5 is moving (M3) towards the cutting position C. The retaining elements in the circumferential surface 52 of the transfer drum 5 are progressively deactivated as the transfer drum 5 moves over the cutting system 4 towards the cutting position C to progressively release the parts of the predetermined length of the continuous length of the first tire component 91 that come into contact with the cutting supports 41-43.

As a result, the predetermined length of the continuous length of the first tire component 91, which was picked up and retained in FIGS. 1A-C, is partly unwound in a controlled manner from the circumferential surface 52 of the transfer drum 5 and is transferred onto the cutting supports 41-43 of the cutting system 4. The magnets or vacuum systems in the cutting supports 41-43 are subsequently activated to retain said unwound part at the cutting system 4. Again, the relative velocity of the circumferential surface 52 of the transfer drum 5 with respect to the cutting supports 41-43 at unwinding of the continuous length of the first tire component 91 is null. At least part of the predetermined length of the continuous length of the first tire component 91 can thus be directly transferred from the transfer drum 5 to the cutting supports 41-43 in a controlled manner without substantial shifting, stretching or compression.

The predetermined length of the continuous length of the first tire component 91 is unwound until the predetermined location or cutting region for the creation of the trailing end 93 is positioned directly over and retained by the intermediate cutting support 41. Subsequently, the knife 44 of the cutting system 4 is brought into contact with said region for cutting the continuous length of the first tire component 91.

FIG. 1E shows the situation in which the cut has been made and a trailing end 93 has been created for the predetermined length of the first tire component 91 upstream of the intermediate cutting support 41. The result is a cut-to-length first tire component 91 which is partly retained on the downstream cutting support 43 and partly around the circumferential surface 52 of the transfer drum 4. At the same time, a leading end 92 has been created for the continuous length of the first tire component 91 remaining on the upstream cutting support 42. After cutting, the intermediate cutting support 41 and the upstream cutting support 42 are dropped (E7, E8) into their lower positions below the conveyor surface 22. The transfer drum 5 is moved upstream (M4) towards the first pick up position A and is at the same time rotated (R3) in the first circumferential direction or winding direction to rewind, pick up or retain the unwound part of the cut-to-length first tire component 91, up to (and including) the trailing end 93.

In FIG. 1F the situation is shown in which the magnets or vacuum system in the downstream cutting support 43 are deactivated and the downstream cutting support 43 has been dropped (E9) to its lower position below the conveyor surface 22. The cut-to-length first tire component 91, including its leading end 92 and its trailing end 93, has now been fully transferred onto the circumferential surface 52 of the transfer drum 5. The transfer drum 5 is moved (M5) to a transfer position next to a building drum and is subsequently rotated in a circumferential direction opposite to that of the building drum 99 to transfer the cut-to-length first tire component 91 onto the building drum 99 in a manner which is known per se. It is noted that, in this example, the cut-to-length first tire component 91 is transferred onto the building drum 99 with the leading end 92 first. If desirable, the trailing end 93 may be transferred first, which requires rotation in opposite circumferential direction from both the transfer drum 5 and the building drum 99. Such a reversed transfer is desirable when, for example, the tire component assembly already provided on the building drum 99 is not entirely flat, and the trailing end 93 is more likely to come into contact with the uneven tire component assembly earlier than the leading end 92 will. The reversed transfer will then reduce the time or length over which the position of the first tire component 91 is undefined.

Figure 2A:
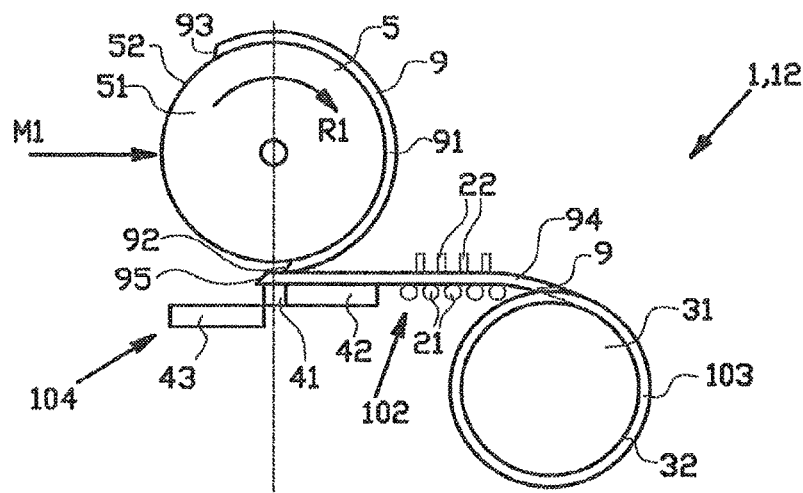
FIGS. 2A-F show the tire building assembly according to FIGS. 1A-1F during six additional steps of the method as shown in FIGS. 1A-1E.
Figure 2B:
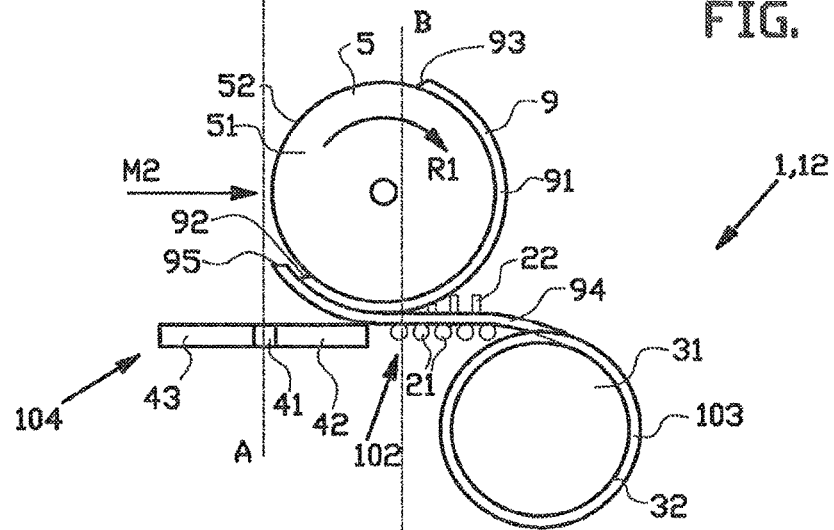
Figure 2C:
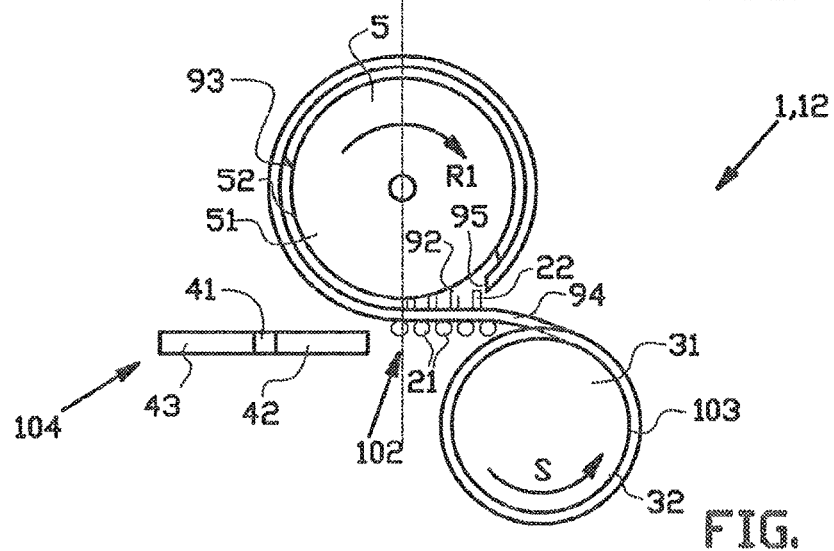
Figure 2D:
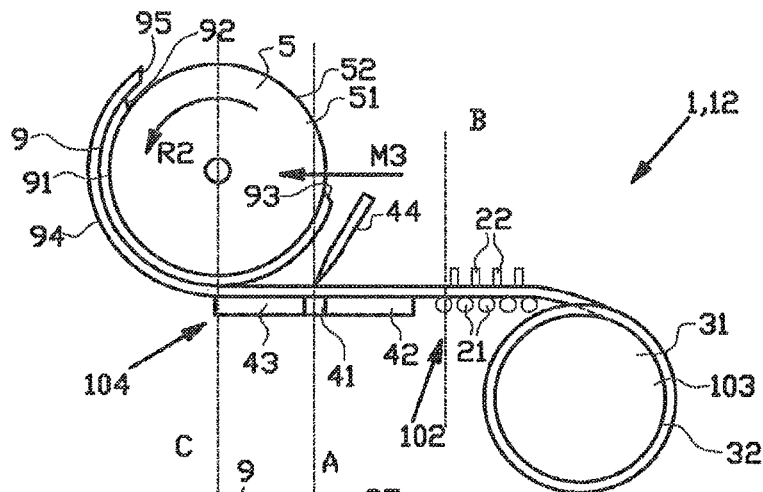
Figure 2E:
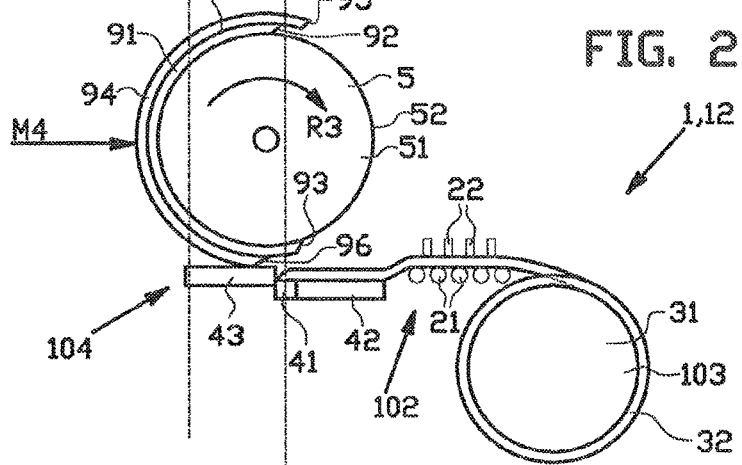
Figure 2F:
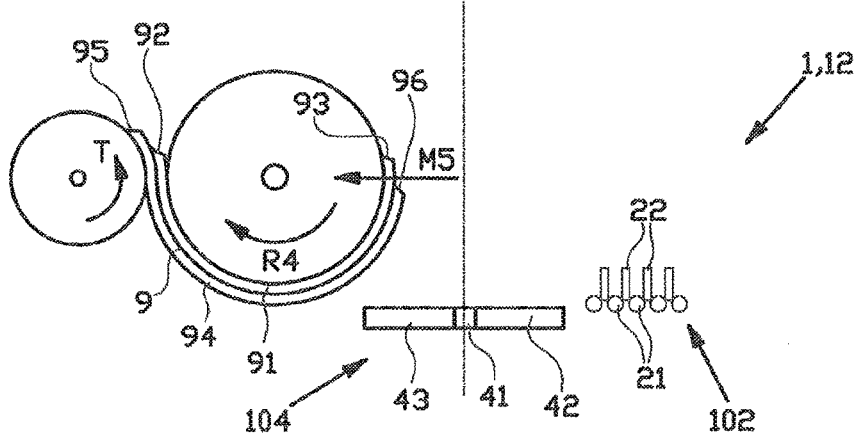

FIGS. 2A-F show six additional steps of the method of picking up and placing tire components 9 using the aforementioned tire building assembly 1. In particular, the steps as shown in FIGS. 2A-F relate to the picking up and placing of the second tire component 94 at the second tire component manufacturing line 12 of the tire building assembly 1. The six additional steps follow the five steps as shown in FIGS. 1A-1E. The step as shown in FIG. 1F is replaced by the step as shown in FIG. 2F, at the end of the method.

It is noted that the steps for the method for picking up and placing the second tire component 94 at the second tire component manufacturing line 12 of the tire building assembly 1 are substantially similar to the steps as shown in FIGS. 1A-F. Movements and rotations in FIGS. 2A-F similar to those in FIGS. 1A-F have been assigned the same arrows and letters. The steps will only be briefly described below.

To arrive at the situation as shown in FIG. 2A, the transfer drum 5, with the cut-to-length first tire component 91 of FIG. 1E retained around its circumferential surface 52, is moved from the first tire component manufacturing line 11 to the second tire component manufacturing line 12. At the second line 12, a continuous length of the second tire component 94 with a leading end 95 from a previous cycle of the method, is already present in the same manner as the continuous length of the first tire component 91 in FIG. 1A.

In FIG. 2A a situation similar to the situation in FIG. 1A is shown, however with the cut-to-length first tire component 91 already present and retained around the circumferential surface 52 of the transfer drum 5. The rotation (R1) of the transfer drum 5 is controlled such that the leading end 92 of the cut-to-length first tire component 91, at contact of the transfer drum 5 with the leading end 95 of the second tire component 94, extends past the leading end 95 of the second tire component 94 in the upstream direction U. Preferably, the distance over which the leading end 92 of the first tire component 91 extends past the leading end 95 of the second tire component 94 is equal or greater than the distance over which the first tire component 91 has been cut at the leading end 92.

Subsequently, the steps as shown in FIGS. 2B-E are performed to pick up, retain, partly unwind, place and cut the continuous length of the second tire component 94 into a cut-to-length second tire component 94 having a leading end 95 and a trailing end 96. The trailing end 96 of the cut-to-length second tire component 94 extends in the downstream direction D past the trailing end 93 of the cut-to-length first tire component 91 over the same distance as the leading end 92 of the first tire component extends past the leading end 95 of the second tire component 94. Thus, the cut-to-length first tire component 91 is shifted with respect to the cut-to-length second tire component 94 in the second circumferential direction or unwinding direction of the transfer drum 5.

As a result of the steps as shown in FIGS. 1A-E and FIGS. 2A-E, the cut-to-length first tire component 91 and the cut-to-length second tire component 94 are picked up and retained around the circumferential surface 52 of the transfer drum 5 to form a laminate in which the second tire component 94 is in a radially outer position with respect to the first tire component 91. In a similar manner, subsequent third or further tire components (not shown) can be picked up to form an even more complex laminate.

FIG. 2F shows a situation similar to the situation as shown in FIG. 1F, however with two tire components 91, 94 being transferred at the same time instead of just one. In particular, it is noted that during the transfer of the laminate of tire components 91, 94 to the building drum 99, the radially outer second tire component 94 on the transfer drum 5 is transferred as a radially inner layer onto the building drum 99, while the radially inner first tire component 91 on the transfer drum 5 is transferred as a radially outer layer onto the building drum 99.

The aforementioned method is particularly suitable for use with the manufacturing of textile or nylon chafers. Chafers are conventionally manufactured on a conveyor and then transferred one by one onto a building drum. In the method according to the invention, the chafers can be pre-assembled on the transfer drum 5 and can be applied simultaneously onto the building drum 99.

Optionally, the tire building assembly 1 is provided with an alignment sensor 101 arranged at the transfer of tire components 9 between the transfer drum 5 and the building drum 99 for detecting misalignment of the tire components 9 and for sending correction signals to the support structure of the transfer drum 5. The support structure and the transfer drum 5 supported thereon can be moved relative to the building drum 99 in response to the correction signals to correct the misalignment during the transfer.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

In summary the invention relates to a method for picking up and placing a tire components, wherein the method comprises the steps of: picking up a supplied first tire component with a transfer drum, rotating the transfer drum in a first direction for winding a predetermined length of the continuous length of the first tire component, rotating the transfer drum in an opposite second direction, while at the same time moving the transfer drum downstream into a cutting position, wherein a part of the predetermined length of the first tire component is unwound from the transfer drum, cutting the unwound part, thereby obtaining a cut-to-length first tire component, and rotating the transfer drum again in the first direction for winding up the unwound part of the cut-to-length first tire component up to the trailing end.

The invention claimed is:

1. A method for picking up and placing a first tire component in a first tire component manufacturing line of a tire building assembly, wherein the first tire component manufacturing line comprises a supply system at an upstream end thereof, a cutting system at a downstream end thereof and a transfer drum with a circumferential surface and retaining elements for picking up and retaining the first tire component around the circumferential surface, wherein the method comprises the steps of:
  a) supplying a continuous length of the first tire component from the supply system in the downstream direction towards the cutting system, wherein the first tire component has a leading end facing in the downstream direction;
  b) positioning the transfer drum in a first pick up position at the leading end of the continuous length of the first tire component and picking up said leading end with the retaining elements;
  c) subsequently rotating the transfer drum in a first circumferential direction for winding a predetermined length of the continuous length of the first tire component around the circumferential surface of the transfer drum and retaining said predetermined length with the retaining elements;
  d) rotating the transfer drum in an opposite second circumferential direction, while at the same time moving the transfer drum downstream into a cutting position at the cutting system, wherein a part of the predetermined length of the first tire component is released from the retaining elements and is unwound from the circumferential surface onto the cutting system;

e) cutting the unwound part of predetermined length of the first tire component at the cutting system to create a trailing end, thereby obtaining a cut-to-length first tire component;

f) rotating the transfer drum again in the first circumferential direction for winding up the unwound part of the cut-to-length first tire component up to the trailing end.

2. The method according to claim 1, wherein the circumferential surface of the transfer drum, in step b), is brought into direct contact with the leading end prior to said leading end being picked up.

3. The method according to claim 1, wherein the part of the predetermined length of the first tire component in step d) is gradually released from the retaining elements after said part has been brought into direct contact with the cutting system.

4. The method according to claim 1, wherein the transfer drum, during step c), simultaneously with the rotation of said transfer drum, moves from the first pick up position to a second pick up position upstream of the first pick up position for partly picking up the predetermined length,
wherein the transfer drum, during the upstream movement in step c), moves upstream at a velocity that is equal to the circumferential velocity of the circumferential surface of the transfer drum,
wherein the transfer drum, after it has arrived in the second pick up position, is rotated further in the first circumferential direction while remaining in the second pick up position for picking up the remainder of the predetermined length.

5. The method according to claim 4, wherein the tire building assembly is provided with a conveyor, wherein the conveyor is arranged at the second pick up position to support or guide the supply of the remainder of the predetermined length from the supply system to the transfer drum.

6. The method according to claim 5, wherein the conveyor is a roller conveyor.

7. The method according to claim 1, wherein the transfer drum, during step d), moves downstream at a velocity that is equal to the circumferential velocity of the circumferential surface of the transfer drum in step d), wherein the transfer drum, during step f) is simultaneously moved upstream from the cutting position at a velocity that is equal to the circumferential velocity of the circumferential surface of the transfer drum in step f).

8. The method according to claim 1, wherein the transfer drum, during step f), is simultaneously moved upstream from the cutting position.

9. The method according to claim 1, wherein the method further comprises repeating steps a) to f) for a second tire component.

10. The method according to claim 9, wherein the tire building assembly further comprises a second tire component manufacturing line with the same features as the first tire component manufacturing line, wherein the transfer drum is moveable between the first tire component manufacturing line and the second tire component manufacturing line, wherein steps a) to f) are repeated for the second tire component at the second tire component manufacturing line.

11. The method according to claim 9, wherein the cut-to-length first tire component is retained around the circumferential surface of the transfer drum during the repetition of steps a) to f) for the second tire component.

12. The method according to claim 9, wherein the cut-to-length first tire component and the cut-to-length second tire component are components for a chafer.

13. The method according to claim 9, wherein, in step e), the unwound part of predetermined length of the first tire component is cut under an angle and, when repeating step e) for the second tire component, the unwound part of predetermined length of the second tire component is cut under another angle opposite to the angle of the cut in the first tire component.

14. The method according to claim 9, wherein the cut-to-length first tire component is shifted in a circumferential direction of the transfer drum with respect to the cut-to-length second tire component.

15. The method according to claim 1, wherein the tire building assembly further comprises a building drum with a circumferential surface, wherein the method further comprises the steps of:
g) moving the transfer drum with the cut-to-length first tire component retained thereon into proximity of the building drum;
h) subsequently rotating the transfer drum and the building drum in mutually opposite circumferential directions for transferring the cut-to-length first tire component from the circumferential surface of the transfer drum onto the circumferential surface of the building drum.

16. The method according to claim 15, wherein the leading end or the trailing end of the cut-to-length first tire component, in step g), is brought into contact with the circumferential surface of the building drum.

17. The method according to claim 15, wherein the method further comprises repeating steps a) to f) for a second tire component, wherein the leading end or the trailing end of the cut-to-length second tire component, in step g), is brought into contact with the circumferential surface of the building drum.

18. The method according to claim 15, wherein the tire building assembly comprises an alignment sensor that is arranged at the transfer of the cut to length first tire component between the transfer drum and the building drum, wherein the alignment sensor, during step h), detects misalignment of the cut to length first tire component and controls the position of the transfer drum relative to the building drum to correct the misalignment.

19. The method according to claim 1, wherein the cutting system comprises an intermediate cutting support and a downstream cutting support directly downstream of the intermediate cutting support, wherein the unwound part of the predetermined length of the first tire component is cut in step e) at the intermediate cutting support, wherein the trailing end of the cut-to-length first tire component is retained by the intermediate cutting support, the downstream cutting support or both until the trailing end is picked up by the transfer drum in step f).

20. The method according to claim 19, wherein the cutting system further comprises an upstream cutting support directly upstream of the intermediate cutting support, wherein the cutting in step e) creates a new leading end for the remaining continuous length of the first tire component upstream of the cutting system, wherein the leading end of the remaining continuous length of the first tire component is retained on the upstream cutting support until it is picked up by the transfer drum in step b) during a next cycle of the method.

21. The method according to claim 20, wherein the first pick up position is located at or near the intermediate cutting support.

22. The method according to claim 19, wherein the cutting supports are provided with magnetic elements or comprise suction openings of a vacuum system for retaining tire components.

23. The method according to claim 1, wherein the retaining elements comprise magnets and suction openings of a vacuum system, wherein the magnets and the vacuum system are operated simultaneously.

* * * * *